(12) United States Patent
Huda

(10) Patent No.: US 11,297,094 B2
(45) Date of Patent: Apr. 5, 2022

(54) AUTOMATED AND CONTINUOUS CYBERSECURITY ASSESSMENT WITH MEASUREMENT AND SCORING

(71) Applicant: CyberCatch, Inc., San Diego, CA (US)

(72) Inventor: Sai Huda, San Diego, CA (US)

(73) Assignee: CYBERCATCH, INC., San Diego, CA (US)

( * ) Notice: Subject to any disclaimer, the term of this patent is extended or adjusted under 35 U.S.C. 154(b) by 0 days.

(21) Appl. No.: 17/409,436

(22) Filed: Aug. 23, 2021

(65) Prior Publication Data

US 2022/0060499 A1 Feb. 24, 2022

Related U.S. Application Data

(60) Provisional application No. 63/069,468, filed on Aug. 24, 2020.

(51) Int. Cl.
*H04L 9/00* (2022.01)
*H04L 29/06* (2006.01)
*H04L 67/02* (2022.01)

(52) U.S. Cl.
CPC ...... *H04L 63/1433* (2013.01); *H04L 63/1416* (2013.01); *H04L 63/1483* (2013.01); *H04L 67/02* (2013.01)

(58) Field of Classification Search
CPC ............. H04L 63/1433; H04L 63/1416; H04L 63/1483

USPC .......................................................... 726/25
See application file for complete search history.

(56) References Cited

U.S. PATENT DOCUMENTS

| | | | |
|---|---|---|---|
| 11,019,089 B1* | 5/2021 | Sharifi Mehr | H04L 63/1433 |
| 2016/0127407 A1* | 5/2016 | Mankovskii | G06F 21/577 726/1 |
| 2019/0222604 A1* | 7/2019 | Vaidya | H04L 63/1433 |
| 2019/0356679 A1* | 11/2019 | Sites | H04L 63/1433 |
| 2020/0184847 A1* | 6/2020 | Gabay | G09B 19/0053 |
| 2020/0304533 A1* | 9/2020 | May | H04L 63/1433 |
| 2020/0396254 A1* | 12/2020 | Crabtree | G06F 16/951 |
| 2021/0075828 A1* | 3/2021 | Kras | H04L 63/1416 |

* cited by examiner

*Primary Examiner* — Christopher J Brown
(74) *Attorney, Agent, or Firm* — Procopio, Cory, Hargreaves & Savitch LLP

(57) ABSTRACT

Automated and continuous cybersecurity assessment with measurement and scoring. In an embodiment, a cyber-hygiene score is calculated based on data representing asserted cybersecurity controls within an entity system. The cyber-hygiene score indicates an extent of implementation of cybersecurity controls associated with a cybersecurity standard. In addition, automated cybersecurity test(s) are performed on the entity system, and a cyber-breach score is calculated based on the test scores calculated from the automated cybersecurity test(s). The cyber-breach score indicates an effectiveness of the implemented cybersecurity controls. The automated cybersecurity test(s) may comprise an inside-out controls test, and outside-in controls test, and/or a social-engineering test (e.g., phishing simulation). A cybersecurity assessment is generated based on the cyber-hygiene score and the cyber-breach score.

28 Claims, 7 Drawing Sheets

600

700

AUTOMATED AND CONTINUOUS CYBERSECURITY ASSESSMENT WITH MEASUREMENT AND SCORING

CROSS-REFERENCE TO RELATED APPLICATIONS

This application claims priority to U.S. Provisional Patent App. No. 63/069,468, filed on Aug. 24, 2020, which is hereby incorporated herein by reference as if set forth in full.

BACKGROUND

Field of the Invention

The embodiments described herein are generally directed to cybersecurity risk management, and, more particularly, to the automation of a cybersecurity assessment.

Description of the Related Art

Virtually every entity that possesses valuable data faces cyber-risk from threat actors, ranging from individual hackers, to organized criminal gangs, to terrorist groups, to hostile nation states. These threat actors seek to steal intellectual property or other data or otherwise cause disruption or harm to entities for financial or other gain. Naturally, governmental bodies and federal and state regulators encourage entities to comply with cybersecurity guidance, such as the National Institute of Standards and Technology (NIST) cybersecurity framework and standards, and to perform a cybersecurity assessment in order to identify and mitigate cyber-risk.

In the United States, the Department of Defense (DoD) has taken the lead to go beyond mere encouragement. In particular, the DoD now requires all defense contractors to implement the Cybersecurity Maturity Model Certification (CMMC) standard and obtain a third-party compliance audit for CMMC certification. The CMMC standards have seventeen security domains and five levels. Each level has mandated cybersecurity controls (e.g., practices and/or processes). For example, Level 1 requires implementation of seventeen cybersecurity controls, Level 3 requires implementation of one-hundred-thirty cybersecurity controls, and Level 5 requires implementation of one-hundred-seventy-one cybersecurity controls.

While the DoD has provided guidance on the CMMC cybersecurity controls in a Portable Document Format (PDF), implementation of these controls remains a challenging task. Using a PDF to perform a cybersecurity assessment to ensure compliance and prepare for a third-party audit is complex, laborious, and time-consuming. Also, the implementing entity is unable to compare its implementation with the implementations of other entities. Thus, the cybersecurity assessment is performed manually and blindly. Consequently, proper cyber-risk mitigation is not timely achieved, and the transfer of cyber-risk from the entity to an insurer is not adequately achieved and/or accurately priced.

In addition, the testing of implemented cybersecurity controls on an ongoing basis is cost-prohibitive. Most companies that can afford cybersecurity testing only perform an annual penetration test. Thus, security holes may remain undetected for months or even years. These security holes create vulnerabilities for threat actors to exploit and are the root cause of the current barrage of data thefts and ransomware attacks.

For insurance providers, cyber-insurance is difficult to underwrite and price without adequate insights into cyber-risk profiles of the entities to be insured. Currently, to underwrite cyber-insurance, insurance companies utilize archaic and inconsistent insurance application forms to request rudimentary information about information security programs. As a result, cyber-insurance underwriting and risk pricing is done imprecisely. Consequently, cyber-insurance premiums are unaffordable for many entities, which therefore, do not carry cyber-insurance, thereby exposing themselves to cyber-risk.

Thus, there is a need for automated cybersecurity assessments so that cyber-risk can be quantified, benchmarked, and mitigated, and implemented cybersecurity controls can be validated and audited, for compliance, certification, insurance, and/or the like, and control failures and security holes can be timely detected and rectified before a threat actor can exploit them, in order to prevent a data theft or ransomware attack. Such technology could better protect entities from cyber-risk and improve corporate, as well as national, security.

SUMMARY

Accordingly, systems, methods, and non-transitory computer-readable media are disclosed for automated cybersecurity assessment.

In an embodiment, a method comprises using at least one hardware processor to: receive data representing asserted cybersecurity controls within an entity system; calculate a cyber-hygiene score based on the received data, wherein the cyber-hygiene score indicates an extent of implementation of a plurality of cybersecurity controls associated with at least one cybersecurity standard; perform one or more automated cybersecurity tests on the entity system, wherein the one or more automated cybersecurity tests comprise at least one of an inside-out controls test, an outside-in controls test, or a social-engineering test; for each of the one or more automated cybersecurity tests, calculate a test score based on results from the automated cybersecurity test; calculate a cyber-breach score based on the test scores calculated for the one or more automated cybersecurity tests, wherein the cyber-breach score indicates an effectiveness of the implementation of the plurality of cybersecurity controls associated with the at least one cybersecurity standard; and generate a cybersecurity assessment based on the cyber-hygiene score and the cyber-breach score. The method may further comprise using the at least one hardware processor to update the cyber-hygiene score based on the results from the automated cybersecurity tests.

The one or more automated cybersecurity tests may be a plurality of automated cybersecurity tests, wherein calculating the cyber-breach score comprises combining the tests scores calculated for the plurality of automated cybersecurity tests. The plurality of automated cybersecurity tests may comprise the inside-out controls test, which is performed by a software agent within the entity system, and the outside-in controls test, which is performed against Internet-facing assets of the entity system from outside the entity system.

The one or more automated cybersecurity tests may comprise the inside-out controls test, wherein the inside-out controls test is executed by a software agent on a node within a network of the entity system. The method may further comprise using the at least one hardware processor to, in response to a triggering event, trigger the inside-out controls test via a call to the software agent. The method may further comprise using the at least one hardware processor to instantiate and configure a dedicated virtual machine to receive results of the inside-out controls test from the software agent.

The one or more automated cybersecurity tests may comprise the outside-in controls test, and wherein the outside-in controls test is performed against Internet-facing assets of the entity system. The method may further comprise using the at least one hardware processor to receive one or more Uniform Resource Locators (URLs), wherein the outside-in controls test is performed on all of the received one or more URLs.

The one or more automated cybersecurity tests may comprise the social-engineering test, wherein the social-engineering test comprises a phishing simulation against one or more email addresses. The method may further comprise using the at least one hardware processor to: receive a specification of a landing page; incorporate a hyperlink to the landing page into an email message; send the email message to each of the one or more email addresses; and track visits to the landing page. The method may further comprise using the at least one hardware processor to host the landing page. The method may further comprise using the at least one hardware processor to: receive a specification of an email template; and generate the email message from the email template. The method may further comprise using the at least one hardware processor to receive a specification of a domain, wherein the email message is sent from the domain. The one or more email addresses may be a plurality of email addresses, and the method may further comprise using the at least one hardware processor to receive a specification of the plurality of email addresses.

Receiving data may comprise: generating a graphical user interface; and receiving responses to a questionnaire via the graphical user interface, wherein the questionnaire comprises one or more of questions, requests for declarative statements, or requests for supporting documents, wherein the cyber-hygiene score is calculated based on the responses.

The method may further comprise using the at least one hardware processor to assign each of a plurality of portions of a questionnaire to one of a plurality of second users based on a user operation from a first user, wherein receiving data comprises, for each of the plurality of second users: generating a graphical user interface; and receiving responses to the portion of the questionnaire, assigned to the second user, via the graphical user interface. The questionnaire may comprise one or more of questions, requests for declarative statements, or requests for supporting documents.

The method may further comprise determining a probability of a cybersecurity breach based on one or more features in one or both of the received data or the results from the one or more automated cybersecurity tests, wherein the cybersecurity assessment is further based on the probability of a cybersecurity breach. The method may further comprise generating a comparison of each of one or more of the cyber-hygiene score, the cyber-breach score, or the probability of a cybersecurity breach to a benchmark derived from peers of an entity operating the entity system, wherein the cybersecurity assessment comprises the comparison. The probability of a cybersecurity breach may be determined using a machine-learning model that is trained to predict the probability of a cybersecurity breach based on the one or more features. The cybersecurity assessment may comprise the cyber-hygiene score, the cyber-breach score, and the probability of a cybersecurity breach. The cybersecurity assessment may comprise a graphical user interface that comprises a hierarchical arrangement of expandable and collapsible graphical elements that provide access to details for the cyber-hygiene score, the cyber-breach score, the probability of a cybersecurity breach, and the comparison.

The method may further comprise detecting one or more failures in the implementation of the plurality of cybersecurity controls associated with the at least one cybersecurity standard, based on one or both of the received data or the results from the one or more automated cybersecurity tests, wherein the cybersecurity assessment identifies each of the detected one or more failures. The method may further comprise, in response to detecting the one or more failures, initiating at least one alert to one or more recipients.

The one or more automated cybersecurity tests may be a plurality of automated cybersecurity tests that comprises the inside-out controls test, which is performed by a software agent within the entity system, the outside-in controls test, which is performed against Internet-facing assets of the entity system from outside the entity system, and the social-engineering test, which comprises a phishing simulation against one or more email addresses, wherein calculating the cyber-breach score comprises combining the tests scores calculated for the plurality of automated cybersecurity tests.

Any of the above methods may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for automated cybersecurity assessment. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview

1.1. Infrastructure

Figure 1:
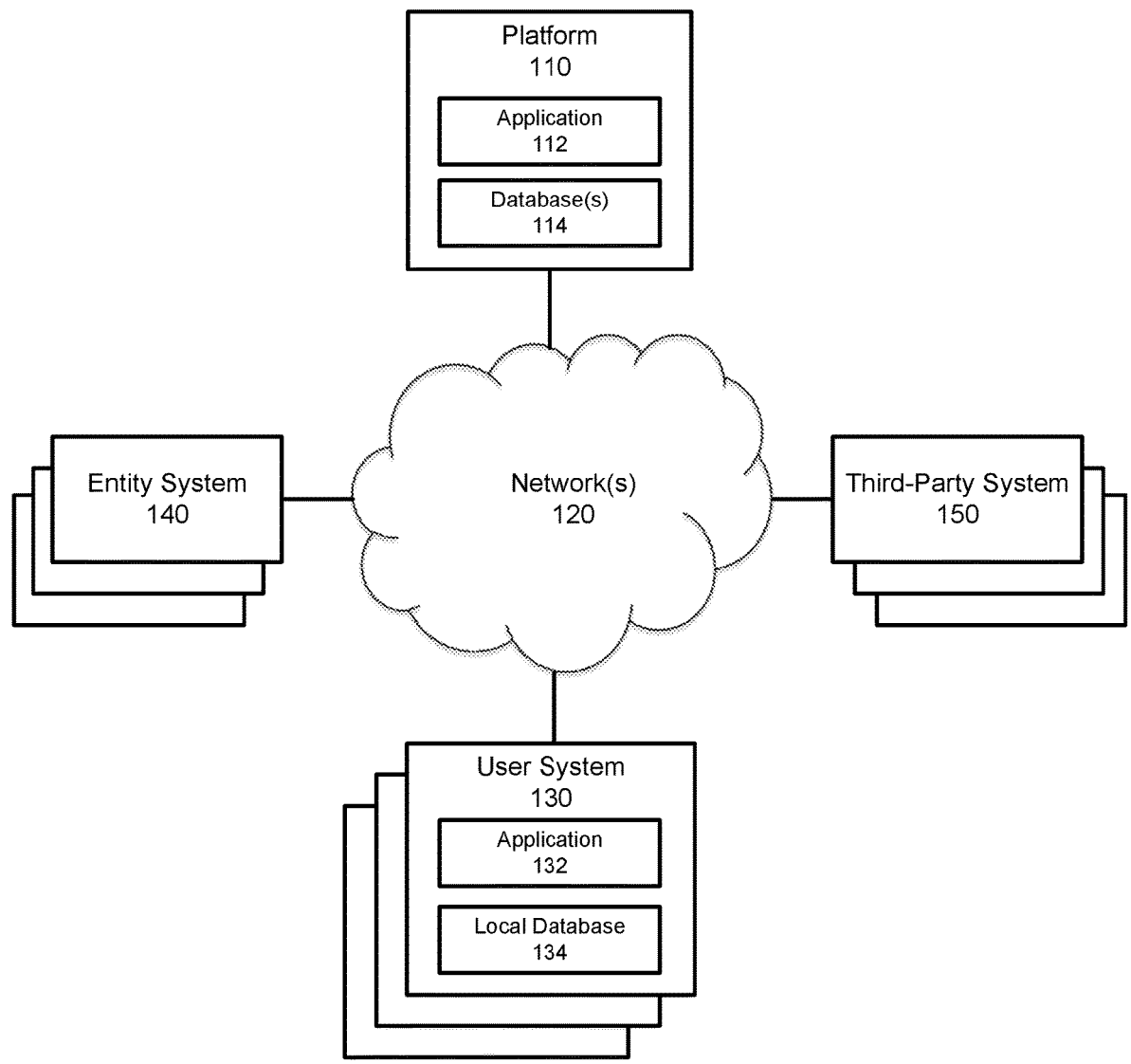
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more entity systems 140 (e.g., to be assessed) and/or one or more third-party systems 150 (e.g., operated by auditors, insurance brokers, insurance providers, etc.) via one or more networks 120.

Network(s) 120 may comprise the Internet, and platform 110 may communicate with user system(s) 130, entity system(s) 140, and/or third-party systems 150 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130, entity systems 140, and/or third-party systems 150 via the Internet, but may be connected to one or more other user systems 130, entity systems 140, and/or third-party systems 150 via an intranet. Furthermore, while only a few user systems 130, entity systems 140, and third-party systems, one server application 112, and one set of database(s) 114 are illustrated, it should be understood that the infrastructure may comprise any number of user systems, entity systems, third-party systems, server applications, and databases.

Entity system(s) 140 may comprise any type or types of computing devices capable of wired and/or wireless communication. However, it is contemplated that an entity system 140 would primarily comprise a server (e.g., supporting a website) or network (e.g., private intranet) that is operated by an entity. As used herein, the term "entity" may refer to any company, corporation, partnership, government agency, non-profit or for-profit organization, department, subsidiary, affiliate, business unit, individual, group of individuals, or any other legal entity, person, or group of people that operates a system or network that might be a target of a threat actor. A typical entity might be a corporation, university, government agency, defense contractor, bank, law firm, hospital, or the like that possesses sensitive and valuable information.

User system(s) 130 may also comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is contemplated that a user system 130 would primarily comprise a personal computer or mobile device that a user, representing an entity or responsible for some aspect of the entity's cybersecurity controls (e.g., a network administrator of the entity), utilizes to access one or more services provided by platform 110 (e.g., via a graphical user interface of a website supported by platform 110).

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™ IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from user system(s) 130, entity system(s) 140, and/or third-party systems 150 and provide responses in eXtensible Markup Language (XML), JavaScript Object Notation (JSON), and/or any other suitable or desired format. In such embodiments, platform 110 may provide an application programming interface (API) which defines the manner in which user system(s) 130, entity system(s) 140, and third-party system(s) 150 may interact with the web service. Thus, user system(s) 130, entity system(s) 140, and third party system(s) 150 (which may themselves comprise servers), can define their own user interfaces, and rely on the web service to implement or otherwise provide the backend processes, methods, functionality, storage, and/or the like, described herein. For example, in such an embodiment, a client application 132, executing on one or more user system(s) 130 and potentially using a local database 134, may interact with a server application 112 executing on platform 110 to execute one or more or a portion of one or more of the various functions, processes, methods, and/or software modules described herein. In an embodiment, client application 132 may utilize a local database 134 for storing data locally on user system 130. Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the software described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions described herein.

1.2. Example Processing Device

Figure 2:
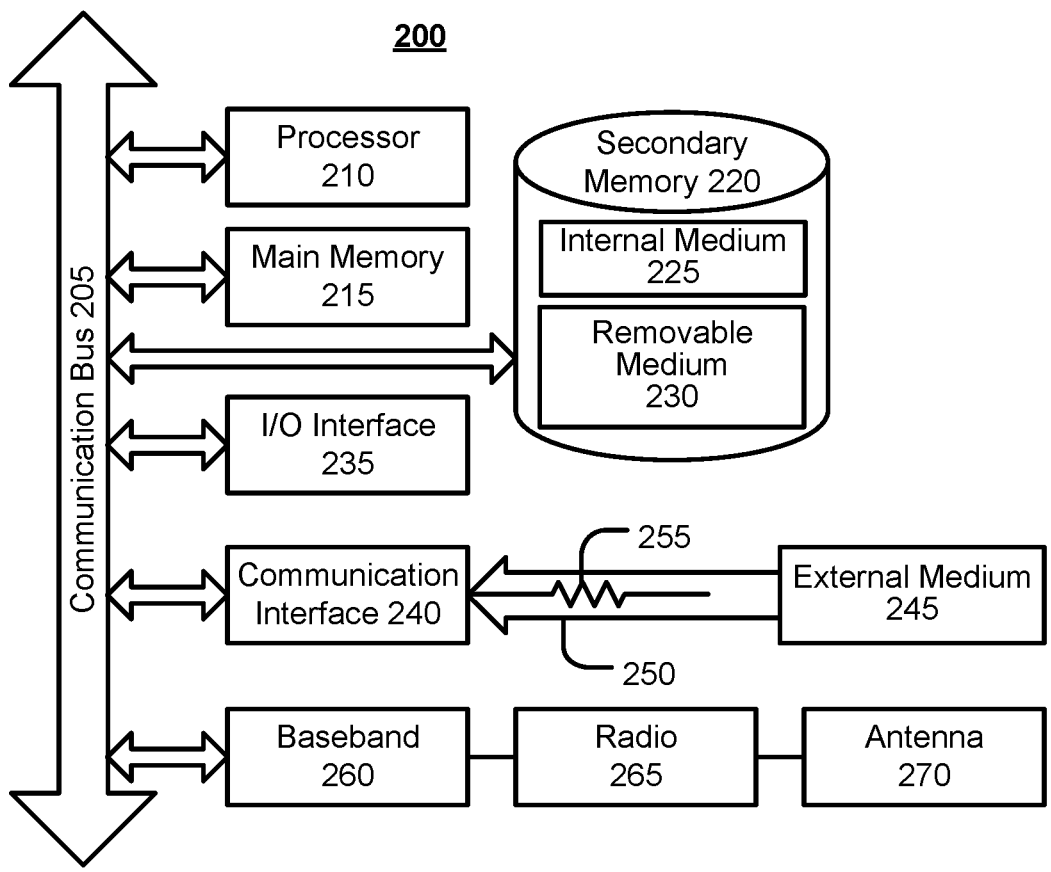
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute one or more software modules) described herein, and may represent components of platform 110, user system(s) 130, entity system(s) 140, third-party system(s) 150, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs, such as the disclosed software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

1.3. Data Flow

Figure 3:
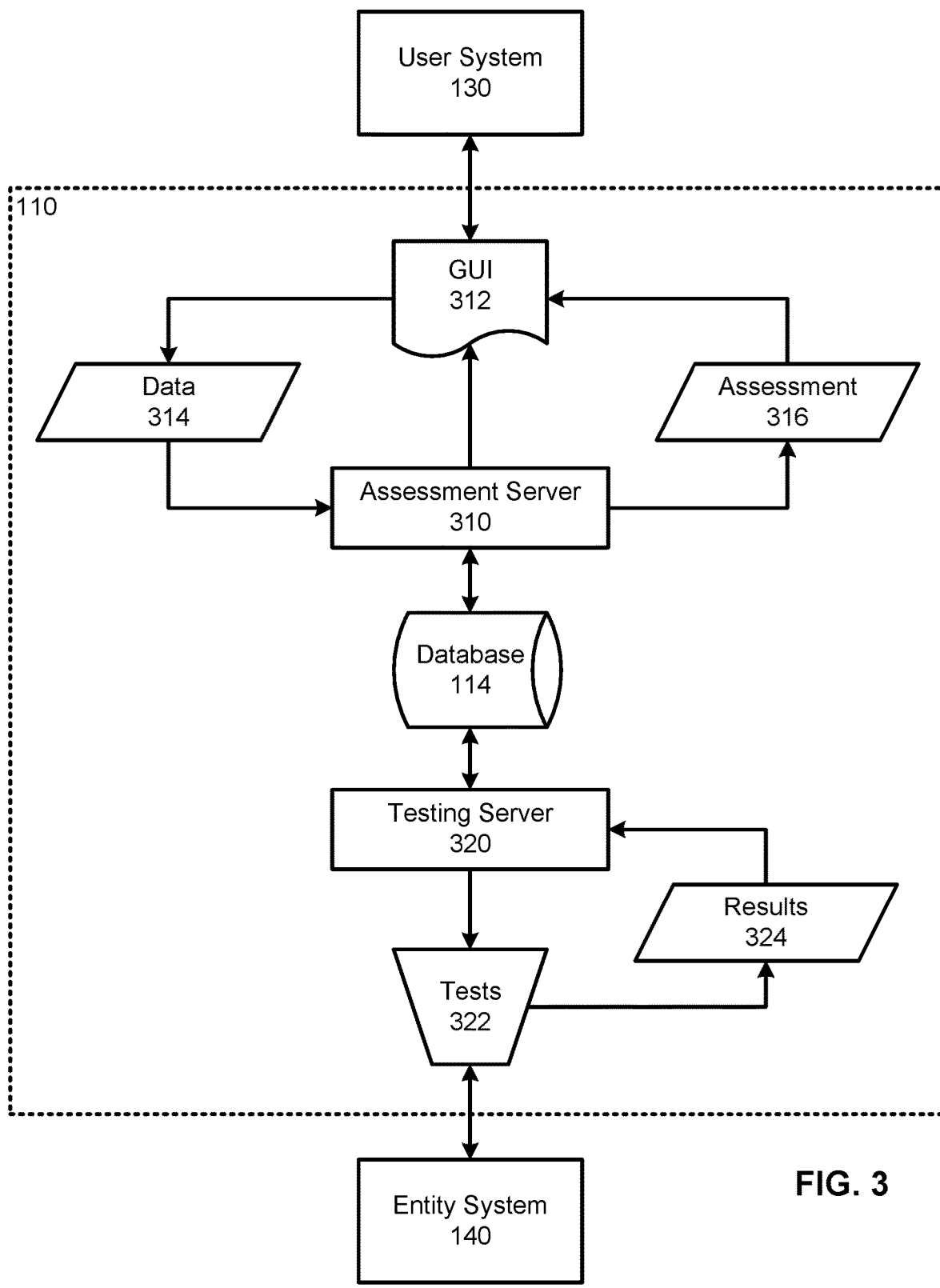
FIG. 3 illustrates an example data flow between a platform, user system, and entity system, according to an embodiment.

FIG. 3 illustrates an example data flow between platform 110, a user system 130, and an entity system 140, according to an embodiment. As illustrated, platform 110 may comprise an assessment server 310 and a testing server 320. Assessment server 310 and/or testing server 320 may be implemented as software services on the same server device or in the cloud, or as separate hardware devices. Assessment server 310 utilizes a graphical user interface (GUI) 312 to collect data 314 from user system(s) 130 and store data 314 in database 114, and testing server 320 tests the cybersecurity of entity system 140 using one or more tests 322 and store the test results 324 of tests 322 in database 114. It should be understood that, in this context, each user system 130 may be operated by the same entity as entity system 140. In other words, data 314 is collected from one or more user system(s) 130 of the entity, and test results 324 are collected from entity system 140 of the same entity. Assessment server 310 utilizes data 314 and/or test results 324 to generate a cybersecurity assessment 316, which may be provided, via graphical user interface 312, to a user system 130 associated with a user representing the entity and/or a third-party user system 130 (e.g., of an auditor, insurance broker, insurance provider, or other third party).

In a contemplated scenario, an entity, as represented by one or more users of one or more user systems 130, would input data 314 to assessment server 310 using GUI 312. Data 314 may be collected over one or a plurality of sessions and stored in database 114, for example, according to a workflow described elsewhere herein. Based on data 314, assessment server 310 or testing server 320 may devise or select one or more tests 322 that are automatically run against entity system 140 over a time period, with the test results 324 stored in database 114. Assessment server 310 may analyze the data, stored in database 114 for the entity, including data 314 and test results 324 to generate a cybersecurity assessment 316 of the entity.

Cybersecurity assessment 316 may comprise one or more scores representing the cybersecurity or cyber-risk of the entity and/or may compare the score(s) representing the cybersecurity or cyber-risk of the entity to benchmark score(s) derived from the entity's peers. As used herein, the term "peers" may refer to organizations (e.g., corporations) that are completely separate from the entity or entities within a separate organization, other entities within the same organization as the entity (e.g., business units or divisions within the same organization, a subsidiary, parent, or other affiliate of the entity, etc.), the entity's suppliers, the entity's customers, and/or the like. Cybersecurity assessment 316 may then be provided to the entity (e.g., a user representing the entity) and/or to a third-party auditor, insurance broker, or insurance provider (e.g., upon authorization of a user representing the entity). In the case that cybersecurity assessment 316 is provided to a third party, cybersecurity assessment 316 may be provided to a user of a user system 130 representing the third party and/or directly to a third-party system 150 (e.g., via an API of third-party system 150). The third party may be an insurance broker or insurance provider that can utilize cybersecurity assessment 316 to underwrite the entity and provide a competitive and informed quote on insurance premiums. Alternatively, the third party could be an auditor that utilizes cybersecurity assessment 316 to facilitate a successful and thorough audit and certification.

In should be understood that the data flow, illustrated in FIG. 3, may be performed and managed by platform 110 for a plurality of different entities. In this case, database 114 may associate data 314 and test results 324 with specific entities (e.g., using a unique entity identifier to link stored data structures). In addition, each cybersecurity assessment 316 may similarly associated with a specific entity. Thus, users may only have access to data 314, tests results 324, and cybersecurity assessments 316 that are associated with the specific entity with which the user is also associated (e.g., via a user account). Platform 110 may enforce these access limits using standard mechanisms for performing authentication (e.g., username and password, one-factor or two-factor authentication, etc.) and establishing permissions and roles.

2. Process Overview

Embodiments of processes for automating a cybersecurity assessment will now be described in detail. It should be understood that the described processes may be embodied in one or more software modules that are executed by one or more hardware processors (e.g., processor 210), for example, as the software discussed herein (e.g., assessment server 310 and/or testing server 320). The described processes may be implemented as instructions represented in source code, object code, and/or machine code. These instructions may be executed directly by hardware processor(s) 210, or alternatively, may be executed by a virtual machine operating between the object code and hardware processors 210. In addition, the disclosed software may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. For example, one or more of the illustrated or described subprocesses may be omitted and/or one or more non-illustrated or undescribed subprocesses may be added. In addition, it should be understood that any subprocess, which does not depend on the completion of another subprocess, may be executed before, after, or in parallel with that other independent subprocess, even if the subprocesses are described or illustrated in a particular order.

Figure 4:
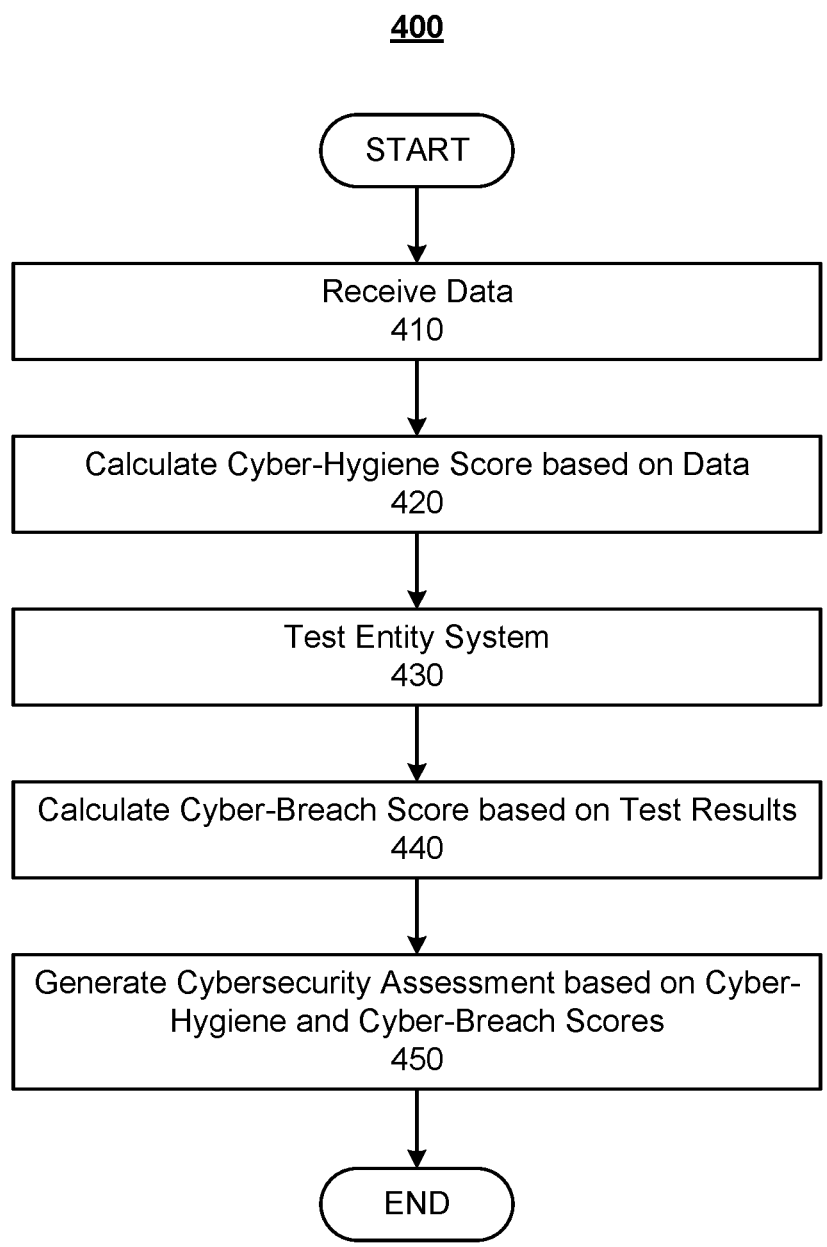
FIG. 4 illustrates an example process for generating a cybersecurity assessment, according to an embodiment.

FIG. 4 illustrates an example process 400 for generating cybersecurity assessment 316, according to an embodiment. Process 400 may be implemented by platform 110, including assessment server 310 and/or testing server 320. For example, subprocesses 410, 420, 440, and 450 may be performed by assessment server 310, and subprocess 430 may be performed by testing server 320. However, other arrangements and configurations for implementing process 400 are also possible.

In an embodiment, assessment server 310 may provide different types of cybersecurity assessments, depending on the intended usage. For example, a first type of assessment may be provided for internal cyber-risk management, a second type of assessment may be provided for auditing of compliance with one standard, a third type of assessment may be provided for auditing of compliance with a different standard, a fourth type of assessment may be provided for requesting an insurance quote, and/or the like. Alternatively, the process 400 may be the same, regardless of the intended usage of cybersecurity assessment 316. However, in such a case, cybersecurity assessment 316 may be sectioned so that the portion(s) of cybersecurity assessment 316 necessary for the intended usage may be easily extracted and provided to a third party.

In subprocess 410, data 314 is received, for example, after the initiation of a new cybersecurity assessment by a supervisory user representing an entity. Data 314 may comprise any data that relate to cybersecurity risks for an entity. Data 314 may be collected, via graphical user interface 312, according to a workflow. For example, in an embodiment, assessment server 310 provides one or more questionnaires that each comprise one or more questions (e.g., regarding a cybersecurity control) and/or requests (e.g., for a declarative statement or verification/confirmation of a declarative statement, to upload supporting documents, etc.) related to the cybersecurity controls of the entity. Cybersecurity controls may comprise cybersecurity practices and/or cybersecurity processes, and cybersecurity controls related to the entity may comprise the cybersecurity controls of specific business units within the entity, divisions within the entity, subsidiaries, parents, or other affiliates of the entity, the entity's suppliers, the entity's customers, and/or the like. In an embodiment that provides different types of cybersecurity assessments, the questionnaires—and therefore, data 314 that is collected using the questionnaires—may differ depending on the type of cybersecurity assessment being performed.

A supervisory user may assign different questionnaires and/or different portions of the one or more questionnaires to one or a plurality of other users (e.g., employees of the entity, including business units or divisions within the entity, employees of a subsidiary, parent, or other affiliate of the entity, employees of an entity's suppliers or customers, or other responsible individuals best suited to respond to the questionnaire) via graphical user interface 312. As used herein, the term "questionnaire" may refer to a plurality of separate questionnaires, or a portion (e.g., section) or a plurality of portions of one or a plurality of questionnaires. Thus, a questionnaire or a plurality of questionnaires for a given cybersecurity assessment may be divided into a plurality of assignable questionnaires that can each be individually assigned to a user, independently from the other questionnaires. A questionnaire may comprise a plurality of questions to be answered, requests for declarative statements, requests for supporting documents, and/or the like, and may be divided by separating these questions and/or requests, individually, in groups, and/or sections, into separate questionnaires that can then be assigned to different users.

In an embodiment, the questionnaire for a given cybersecurity assessment may be separated and assigned according to security domains. For example, different portions (e.g., sections or groups of questions/requests) of the questionnaire may relate to different security domains. The supervisory user may assign one or more security domains to specific users, and assessment server 310 may automatically extract the portion(s) of the questionnaire that are associated with each security domain into separate questionnaires and assign those separate questionnaires to the users to which they were assigned. The supervisory user may also specify a common or independent due date for the completion of each assigned questionnaire, or the system may automatically set a due date for each assigned questionnaire. Assessment server 310 may store the assignment of each security domain or questionnaire, along with any associated due dates, in database 114.

Assessment server 310 may provide the assigned questionnaires, via graphical user interface 312, to the users to which they were assigned. The assigned users may submit responses to their assigned questionnaires via one or more inputs of graphical user interface 312. The responses may comprise answers to questions, declarative statements, supporting documents, and/or the like. Assessment server 310 receives and store each assigned user's response(s) to their assigned questionnaire(s) in database 114.

Assessment server 310 may monitor the due dates for each assigned questionnaire, and, if an assigned questionnaire has not been completed within a time period before the due date, on the due date, or after the due date has passed, send a due-date reminder (e.g., via email message) to the user to which the questionnaire was assigned. Assessment server 310 may also track the progress (e.g., as a percentage) in completing the questionnaire for each initiated cybersecurity assessment. Assessment server 310 may provide a dashboard in graphical user interface 312 that displays the progress in completing the questionnaire, as well as details about the collected responses and/or the like. It should be understood that completion of the questionnaire means that all responses to the questionnaire have been returned, and that the progress may be defined as the percentage or ratio of the number of collected responses to the total number of questions and requests in the questionnaire.

In an embodiment, assessment server 310 may prompt the supervisory user to approve or reject the completed questionnaire and/or the assigned questionnaires as they are completed. Rejected questionnaires may be returned to the assigned users (e.g., via the assigned user's dashboard) for rectification.

In an embodiment, assessment server 310 may provide a one-click copy feature that enables a user to import a completed questionnaire (i.e., with all responses) from a past assessment into a new assessment. Thus, a new cybersecurity assessment can be jump-started by importing data 314 from a prior (and preferably, recent) cybersecurity assessment, thereby saving times and resources.

In subprocess 420, assessment server 310 may calculate a cyber-hygiene score based on the data 314, collected in subprocess 410 and stored in database 114. The cyber-hygiene score may be computed after all responses to the questionnaire has been collected (e.g., and approved by the supervisory user) or as the responses to the questionnaire are collected. In particular, the cyber-hygiene score is based on an analysis of the responses, including answers to questions, declarative statements, and supporting documents, collected in data 314 in subprocess 410. The cyber-hygiene score represents a level of cyber-hygiene practiced by the entity being assessed and the entity's susceptibility to cyber-risk. It should be understood that cyber-hygiene refers to the controls (e.g., practices and processes) that the entity undertakes to maintain system health and online security. The cyber-hygiene score represents a level of compliance with, and the extent of implementation of, cybersecurity controls.

In an embodiment, the cyber-hygiene score may be derived based on the cybersecurity controls, associated with the cybersecurity standard being used for the cybersecurity assessment, that have been implemented by the entity, as determined from data 314. Each cybersecurity control (e.g., practice or process) may be assigned a weight. It should be understood that different cybersecurity standards may comprise different combinations of cybersecurity controls and/or assigned weights. Each cybersecurity control being assessed may be assigned a weight having an integer value ranging from 1 to N (e.g., 1 to 5), with higher weights indicating greater importance to the given cybersecurity standard and lower weights indicating less importance to the given cybersecurity standard. Alternatively, all of the cybersecurity controls may be weighted equally (e.g., a weight of 1), in which case the cybersecurity controls are essentially unweighted. The weights for all cybersecurity controls, which data 314 indicate have been implemented by the entity, may be summed to produce the cyber-hygiene score. In addition, in an embodiment, for one or more of the cybersecurity standards, the weights for all cybersecurity controls, which data 314 indicate have not been implemented by the entity, may be summed and subtracted from the cyber-hygiene score to produce the final cyber-hygiene score. As an example, for the NIST 800-171 cybersecurity standard, there are 110 cybersecurity controls. If each cybersecurity control has a weight of 1, the cyber-hygiene score may range from −110 to +110. Alternatively, in an embodiment, for a given cybersecurity control, the weight that is added for the presence of the cybersecurity control may be different than the weight that is subtracted for the absence of the cybersecurity control (e.g., the weight for the presence may be 1, whereas the weight for the absence may be 1, 3, 5, etc.). It should be understood that the cyber-hygiene score may be normalized to a scale that is easier to comprehend and/or combine with other scores (e.g., a scale of 0 to 100, a scale of 0 to 1, etc.).

In subprocess 430, test server 320 may execute one or more tests 322 against the entity system 140 being assessed, to produce test results 324. Tests 322 may be designed to validate or assess actual compliance with the cybersecurity controls represented or otherwise indicated in data 314 (e.g., in the responses to the questionnaire). In an alternative or additional embodiment, test results 324 may be imported, via an API call, from an external system, such as entity system 140 or a third-party system 150, that performed tests 322. In any case, test results 324 may be mapped to the same security domains as are present in the questionnaire by which data 314 was collected. In other words, test results 324 may be mapped to corresponding data 314. This mapping can be used to identify the current statuses of, and/or to validate, the cybersecurity controls represented in the responses in data 314.

Examples of tests 322 include, without limitation, automated controls tests, vulnerability scans, penetration tests, phishing tests, and/or the like. In a particular implementation, tests 322 comprise an automated, inside-out penetration test of implemented controls inside entity system 140, an automated, outside-in scan from outside entity system 140 of Internet-facing information technology (IT) assets to identify unpatched vulnerabilities and security weaknesses in any web applications hosted by entity system 140, and an automated phishing simulation against users of entity system 140 to identify susceptibility of entity system 140 to social engineering.

In subprocess 440, assessment server 310 may calculate a cyber-breach score based on test results 324. In an embodiment, each test result 324 may be converted into a test score, and the cyber-breach score may be computed as an aggregation of these test scores. All of the test scores may be scaled to the same or similar range of values (e.g., zero to one hundred), so that they can be more easily combined. For example, the cyber-breach score may be an average (e.g., unweighted or weighted average) of all of the test scores. As discussed elsewhere herein, a cyber-penetration score, cyber-scan score, and cyber-phishing score may be calculated based on the results of different tests 322, and the cyber-breach score may be calculated as the average of the cyber-penetration, cyber-scan, and cyber-phishing scores.

In addition to or instead of calculating a separate cyber-breach score, assessment server 310 may update the cyber-hygiene score, initially calculated in subprocess 420, based on test results 324. In particular, test results 324 may be used to validate the responses concerning the entity's cybersecurity controls in data 314. For example, the initial cyber-hygiene score may be based on data 314 under the assumption that the responses are true. However, if tests results 324 demonstrate that a portion of the responses overstate the entity's cybersecurity controls, the cyber-hygiene score may be revised downward to reflect this underperformance. Similarly, if test results 324 subsequently demonstrate that a portion of the responses understate the entity's cybersecurity controls, the cyber-hygiene score may be revised upwards to reflect this over performance.

In subprocess 450, assessment server 310 may generate cybersecurity assessment 316 using the cyber-hygiene score, calculated in subprocess 420, and/or the cyber-breach score, calculated in subprocess 440. Cybersecurity assessment 316 may be represented in a dashboard of graphical user interface 312 and/or exported as a file. In an embodiment, cybersecurity assessment 316 comprises visual representations of the cyber-hygiene score and/or cyber-breach score, as well as the results of benchmarking analytics, to facilitate risk mitigation, action, and planning. The benchmarking analytics may compare the cyber-hygiene score, cyber-breach score, responses in data 314, and/or the like, for the entity being assessed, to peers in the same and/or similar industries (e.g., as percentile rankings of the entity relative to its peers) to provide context to data 314. The comparisons may be expressed visually (e.g., in charts, graphs, tables, as percentiles, etc.) to facilitate the identification of trends and patterns. In an embodiment, the results of the benchmarking analytics may be shown in response to the selection of a single input (e.g., one click of an input device or touch panel display) within a graphical user interface representing cybersecurity assessment 316.

Cybersecurity assessment 316 may also comprise alerts (e.g., email message, text message, such as Short Message Service (SMS) or Multimedia Messaging Service (MMS) text message, telephone call, etc.) that are triggered when a cybersecurity control is detected to be deficient based on tests 322, a plan of action that identifies the overall cybersecurity practices and processes that are deficient or require corrective action, and/or a system security plan that identifies the status and details of all cybersecurity controls that must be fully implemented and operational to mitigate cyber-risk and comply with a given standard (e.g., CMMC). Cybersecurity assessment 316 may also comprise other analytics, performed by assessment server 310, to facilitate risk mitigation and planning. These other analytics may utilize artificial intelligence (AI), such as machine-learning models (e.g., supervised learning for regression and classification, unsupervised learning for cluster models, etc.), to calculate the probability of a data breach based on one or more features, such as test results 324 over a period of time, type(s) of cybersecurity controls that failed and/or weightings of failed cybersecurity control(s), recurrence of failures in cybersecurity controls, time taken to rectify deficiencies in cybersecurity controls, benchmarking results, and/or the like. The results of the analytics (e.g., the calculated probability of a data breach) may be incorporated into cybersecurity assessment 316 to supplement the cyber-breach score.

In an embodiment, subprocesses 410 and/or 430 may be performed periodically or over a time period. For example, as an entity updates or otherwise changes its cybersecurity controls, user(s), representing the entity, may also update data 410 to reflect those changes. In this case, subprocess 420 may be implemented periodically to update the cyber-hygiene score based on the updated data 410. In addition, in an embodiment in which tests 322 are performed periodically or over a time period in multiple iterations of subprocess 430, subprocess 440 may be executed periodically to update the cyber-breach score and/or the cyber-hygiene score based on test results 324. Assessment server 310 may automatically update cybersecurity assessment 316 based on updates to data 314 and/or test results 324, and the resulting updates to the cyber-hygiene and/or cyber-breach scores.

As described above, in an embodiment, platform 110 provides an online portal, comprising a graphical user interface 312 through which an entity inputs data 314 to obtain a cybersecurity assessment 316, including a cyber-hygiene score, cyber-breach score, benchmarking to peers, validation of implemented practices and processes via automated testing, probability of a data breach, and/or the like. An entity may utilize cybersecurity assessment 316 to implement risk mitigation and comply with cybersecurity standards and mandates (e.g., CMMC). Cybersecurity assessment 316, as visually represented in graphical user interface 312, may enable the user to drill down into the benchmarking analytics, for example, to view comparisons of specific cyber-risks and implemented controls for the entity to those same cyber-risks and implemented controls for peers of the entity (e.g., as a percentile ranking with respect to peers), to indicate how the entity's cybersecurity compares to its peers (e.g., similar entities in the same or similar industries). In an embodiment, graphical user interface 312 may enable the user to drill down to a specific question or declarative statement from the questionnaire(s) and view a benchmark comparison (e.g., percentile) between the entity's response and the responses from peers. Thus, the entity may compare itself to its peers at a granular per-risk or per-control level of detail, which may aid the entity in determining what security domains or other cybersecurity features to prioritize for risk mitigation. In addition, graphical user interface 312 may enable the user to drill down to the root causes or contributing factors for the cyber-hygiene score, cyber-breach score, benchmarking to peers, probability of a data breach, and/or the like. These factors may comprise detected deficiencies or failures in cybersecurity controls (e.g., in data 314 and/or test results 324), other details from data 314 and/or test results 324, a history of performance of cybersecurity controls, benchmarking comparisons, and/or the like. This insight, especially in combination with inside-out and outside-in controls testing, can provide timely intelligence on the efficacy of cybersecurity controls and any security holes or other vulnerabilities, to facilitate the timely rectification of those vulnerabilities before a threat actor can exploit them. Thus, cyber-risk can be mitigated and data theft or ransomware attacks can be prevented.

It should be understood that in any case where the present description mentions drilling down into some detail, this may be implemented in graphical user interface 312 as a hierarchical arrangement of expandable and collapsible graphical elements that provide access to the details. For example, an expandable graphical element may comprise a "+" (plus) or similar icon that, when selected, expands a frame to show descendant details under an ancestral detail, and switches to a collapsible graphical element. The collapsible graphical element may comprise a "−" (minus) or similar icon that, when selected, collapses the expanded frame to hide the descendant details under the ancestral detail, and switches to the expandable graphical element.

In addition, a user representing the entity may utilize graphical user interface 312 of the online portal to authorize the sharing of cybersecurity assessment 316 with a third party, such as a third-party auditor for certification that the entity complies with a given standard (e.g., NIST, CMMC, etc.) and/or an insurance provider for the acquisition of affordable cyber-insurance that appropriately transfers cyber-risk from the entity to the insurance provider. If the user authorizes sharing of cybersecurity assessment 316 with a third party, cybersecurity assessment 316 may be sent to the third-party via any transmission method (e.g., email message, regular mail or shipping, etc.) or to third-party system 150 via an API provided by third-party system 150. Alternatively, the third-party could retrieve cybersecurity assessment 316 from platform 110 via an API provided by platform 110.

It should be understood that the version of cybersecurity assessment 316 that is provided to a third party may differ from the version of cybersecurity assessment 316 that is available to the entity itself and/or to other third parties. For example, the version of cybersecurity assessment 316 that is provided to the third party may be a smaller subset of the version of cybersecurity assessment 16 that is available to the entity itself, and may consist of only the information needed to complete the third party's role (e.g., audit, certification, or offer or issuance of an insurance policy). In the case of a third-party auditor, the version of cybersecurity assessment 316 provided to the third-party auditor may comprise any data 314 (e.g., responses, declarative statements, supporting documents, etc.) or tests results 324, including potentially the cyber-hygiene and/or cyber-breach scores, necessary to facilitate the audit. In the case of a third-party insurance provider, the version of cybersecurity assessment 316 provided to the third-party insurance provider may comprise any data 314 (e.g., responses, declarative statements, supporting documents, etc.) or test results 324, including potentially the cyber-hygiene and/or cyber-breach scores and/or benchmarking results, necessary or useful to underwrite the entity's cyber-risk and price the entity's premiums for cyber-insurance. In effect, cybersecurity assessment 316 can be used as an underwriting tool for the affordable offloading of cyber-risk to an insurance provider.

3. Automated Inside-Out Controls Testing

Figure 5:
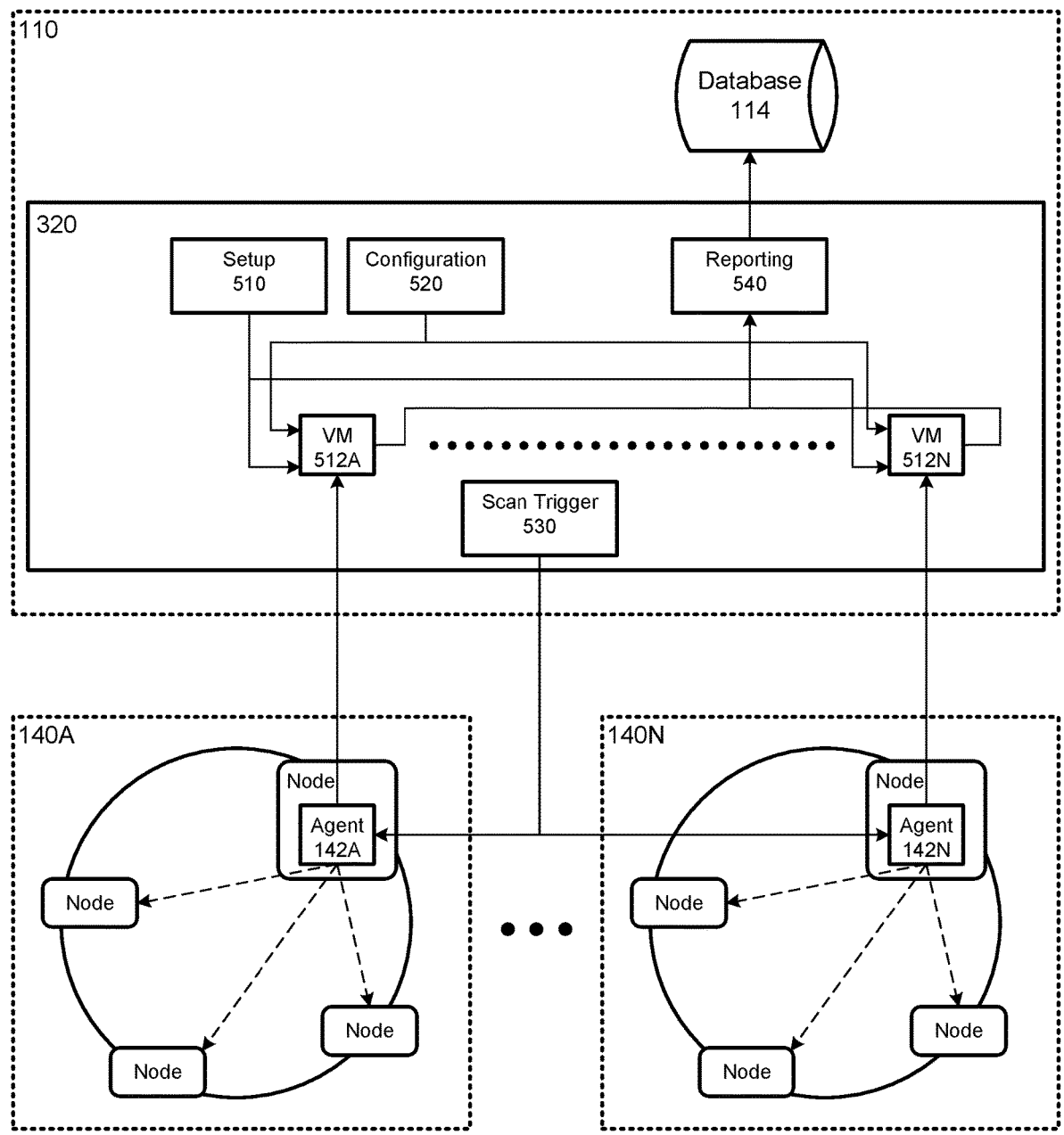
FIG. 5 illustrates an example data flow for automated inside-out controls testing, according to an embodiment.

In an embodiment, testing server 320 may perform an automated inside-out controls test from within a network of entity system 140, to test, for example, the penetrability of entity system 140. FIG. 5 illustrates an example data flow for automated penetration testing, according to an embodiment. As illustrated, testing server 320 may comprise a setup module 510, a configuration module 520, a scan trigger module 530, and a reporting module 540. Testing server 320 may be implemented in a virtual private cloud (VPC) (e.g., in the Amazon™ AWS cloud environment). Similarly, the entity systems 140 being tested may be implemented in separate and distinct virtual private clouds (e.g., in the same Amazon™ AWS cloud environment or in a different cloud environment). However, testing server 320 and entity systems 140 do not necessarily need to be implemented in cloud environments.

During an onboarding process, setup module 510 may instantiate a virtual machine 512 for each entity to be tested (e.g., represented by virtual machines 512A to 512N). Configuration module 520 may configure each virtual machine 512 according to one or more parameters.

Each entity may install an agent 142 on a node within the network of its respective entity system 140 (e.g., represented by agents 142A to 142N). For example, the entity may identify a specific machine on which to install agent 142. A user representing the entity may download and install agent 142 to that machine. In an embodiment, the entity may also provide inbound HTTPS (e.g., port 443) access to and outbound HTTPS access from the machine on which agent 142 is installed (e.g., through a firewall of entity system 140). Agent 142 may be provided as cloud-based software as a service (SaaS).

Scan trigger module 530 may trigger an agent 142 in an entity system 140 based upon a triggering event. The triggering event may be specified, via graphical user interface 312, by a user representing the entity. The triggering event may be a manual triggering by the user (e.g., by selecting one or more inputs in graphical user interface 312), the expiration of a time interval (e.g., specified by the user for periodic testing), the current time reaching a particular date and time (e.g., specified by the user for future testing), or any other type of trigger. Upon the occurrence of a triggering event for a given agent 142, scan trigger module 530 may trigger that agent 142 via a call (e.g., a secure API call, through the firewall of entity system 140) to the agent installed within the respective entity system 140. It should be understood that different agents 142 for different entities may have different triggering events, such that they may be triggered independently from each other.

When triggered, agent 142 may scan the network of entity system 140, including all relevant nodes on the network, to identify vulnerabilities within the network, including, for example, non-compliance with particular cybersecurity controls. These tests may comprise detecting the use of weak passwords, missing multi-factor authentication controls, missing utilization of encryption of data at rest and in transit, open insecure ports, and/or a variety of other vulnerabilities.

The results of the scan may be collected in a database accessible to agent 142, and then uploaded to the virtual machine 512 that is associated with the entity whose network is being scanned (e.g., agent 142A may upload the scan results to virtual machine 512A). The test results 324 from the scan may be uploaded by agents 142 to their respective virtual machines 512 via a secure API call to platform 110. Virtual machines 512 may provide test results 324 from the scans performed by their respective agents 142 to reporting module 540, which may store test results 324 in database 114 for access by assessment server 310 when assessment server 310 generates cybersecurity assessment 316. In an embodiment, detailed test results 324 may be incorporated into cybersecurity assessment 316.

In an embodiment, an overall cyber-penetration score may be calculated for a given penetration test and/or for a combination of penetration tests (e.g., as an average). For example, the cyber-penetration may be a value, in a range of zero to one hundred, that increases as the number of passed tests increases (i.e., successful penetrations decrease) and decreases as the number of passed tests decreases (i.e., successful penetrations increase). As one example, the cyber-penetration score may be calculated by starting with the maximum score and subtracting a deduction amount associated with each failed penetration test. It should be understood that different penetration tests may be weighted with different deduction amounts (e.g., deduction amounts within a range of one to five), with higher deduction amounts representing a more critical failure than lower deduction amounts. The maximum score and/or the deduction amounts may vary depending on the particular standard (e.g., NIST 800-171, CMMC L1, CMMC L2, CMMC L3, CMMC L4, CMMC L5, etc.) with which the entity is attempting to comply (e.g., selected as the type of cybersecurity assessment). Once all deduction amounts have been subtracted from the maximum score, the resulting score may be converted to a percentage (i.e., resulting score divided by maximum score, and multiplied by one hundred) to produce the cyber-penetration score in a range of zero to one hundred, so that the cyber-penetration score can be more easily combined with other test scores.

4. Automated Security Scan

Figure 6:
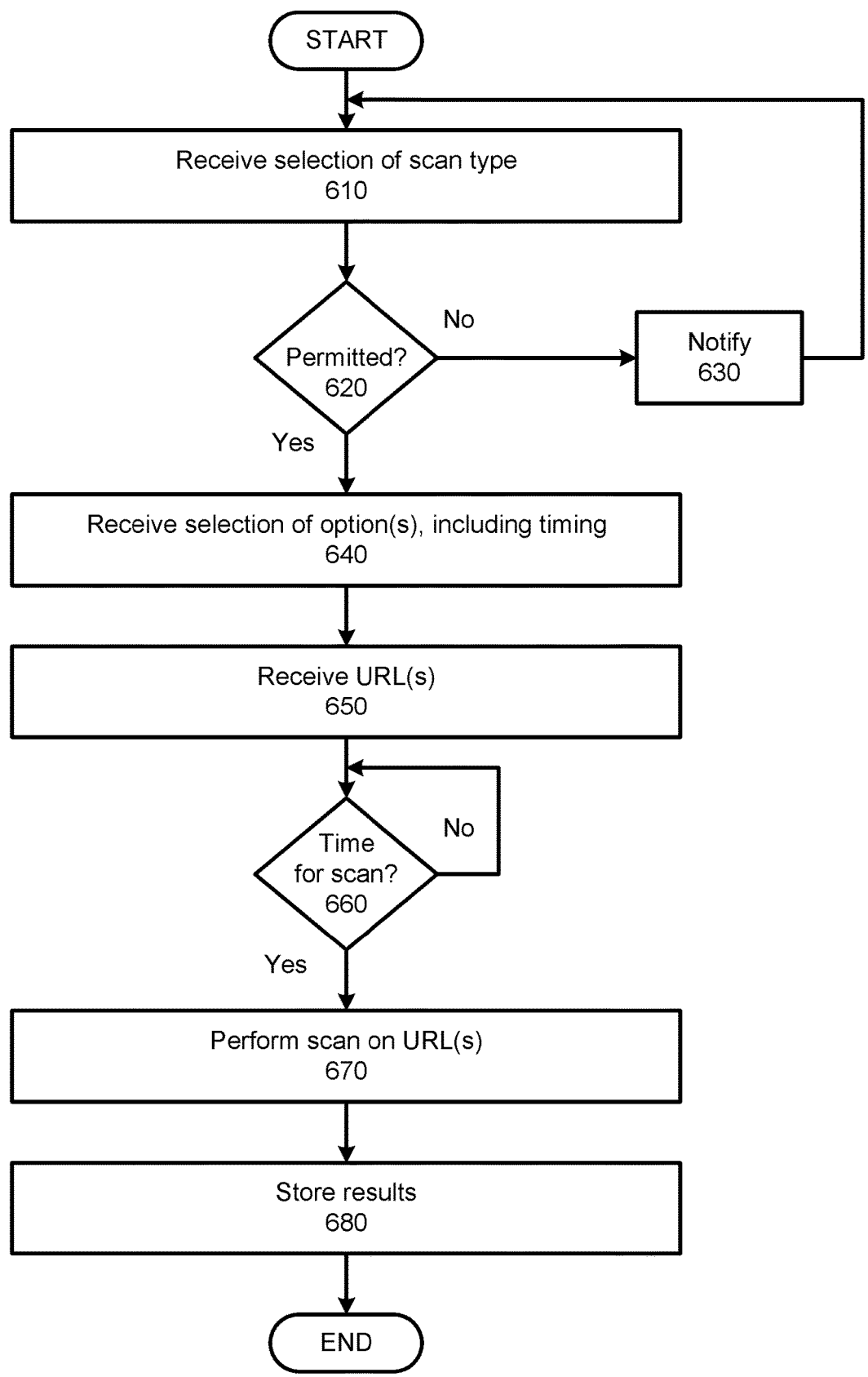
FIG. 6 illustrates an example flowchart for an automated outside-in controls test, according to an embodiment.

In an embodiment, testing server 320 may perform an automated outside-in controls test or security scan against Internet-facing IT assets of entity system 140. FIG. 6 illustrates an example flowchart for an automated scanning process 600, according to an embodiment. Process 600 may be implemented by platform 110, including assessment server 310 and/or testing server 320, to establish an automated scanning campaign. For example, subprocesses 610-650 may be performed by assessment server 310, and subprocesses 660-680 may be performed by testing server 320. However, other arrangements and configurations for implementing process 600 are also possible.

In an embodiment in which multiple types of security scans are available, a selection of the type of scan to be performed is received in subprocess 610. In particular, the user, representing an entity, may specify the type of scan via graphical user interface 312. For example, testing server 320 may provide both an active scan and a passive scan. In a passive scan, test 322 scans Internet-facing IT assets for unpatched vulnerabilities, open ports, missing Transport Layer Security (TLS), and/or the like, without attempting to penetrate those assets (e.g., via brute force selection and entry of passwords or other hacking techniques). In contrast, in an active scan, test 322 may scan Internet-facing IT assets for unpatched vulnerabilities, open ports, missing TLS, and/or the like, and also attempt to penetrate those assets (e.g., via brute force or other hacking techniques). Active scans may be limited to certain entities (e.g., for an additional fee) or ethical hackers who are permitted by an entity to perform active scans against the entity's assets.

If a user attempts to select a type of scan that is not permitted (e.g., an active scan) for the entity's account (i.e., "No" in subprocess 620), the user may be notified that the type of scan is not permitted and/or prompted to contact support for more information in subprocess 630. Otherwise, if the user selects a type of scan that is permitted (e.g., a passive scan) for the entity's account (i.e., "Yes" in subprocess 620), process 600 proceeds to subprocess 640. In an alternative embodiment, the user may not be provided the option in graphical user interface 312 to select any type of scan which is not permitted for the entity's account. In this case, subprocesses 620 and 630 may be omitted, since the user will only be able to select permissible scan types in subprocess 610.

Once a user has selected a permissible scan type in subprocess 610, the selection of parameters or other options for the selected scan, including the timing, of the scan may be received in subprocess 640. In particular, the user, representing an entity, may specify any available options, or alternatively, accept default values for the available options. The timing may be immediate, a future date and time, time interval or frequency for periodic testing, and/or the like.

In subprocess 650, one or more uniform resource locators (URLs) may be received. In particular, the user, representing an entity, may specify a set of URL(s) by selecting a group of previously specified URL(s), uploading a list of URL(s) (e.g., as a file), and/or manually inputting URL(s). In the event that a user uploads a list of URL(s) or manually inputs URL(s), graphical user interface 312 may provide the user with an option to save those uploaded or inputted URL(s) as a group for future selection (e.g., for future tests or other services provided by platform 110). It should be understood that the URL(s) received in subprocess 650 represent URL(s) for resources of entity system 140.

In subprocess 660, process 600 waits for the timing specified in the options in subprocess 640. It should be understood that if no timing was specified or the timing was specified as immediate, subprocess 660 may be skipped, such that process 600 proceeds directly from subprocess 650 to 670. Otherwise, if the timing is specified as a future date and time or as a time interval or frequency, subprocess 660 waits until the specified future date and time, expiration of the specified time interval, or according to the specified frequency. In particular, if it is not time for the scan (i.e., "No" in subprocess 660), process 600 continues to wait. On the other hand, if it is time for the scan (i.e., "Yes" in subprocess 660), process 600 proceeds to subprocess 670.

In subprocess 670, the scan is performed on the one or more URLs received in subprocess 650. In particular, testing server 320 may scan the URL(s) according to one or more tests 322 to detect, for example, unpatched vulnerabilities, open ports, missing TLS, and/or the like. In an active scan, testing server 320 may also try to exploit detected vulnerabilities, using brute force or other known hacking techniques. In subprocess 680, the results of the scan may be stored (e.g., in database 114) for reporting (e.g., in cybersecurity assessment 316).

As each scanning campaign is being performed on the URL(s), the results of the scanning campaign may be displayed, in real time and/or after completion of the scanning campaign, in the dashboard of graphical user interface 312. For example, the dashboard may display performance metrics, URLs scanned, progress (e.g., how many URLs remain to be scanned, the percentage of total URLs remaining to be scanned, etc.), a list of any vulnerabilities detected and their respective severities, a list of any failed scans, any test scores that have been calculated, and/or the like. The dashboard or other screen of graphical user interface 312 may also comprise an input for pausing or terminating the scanning campaign before completion. Graphical user interface 312 may also comprise an input for suppressing a scanning campaign from reporting, for example, if the scanning campaign is only being performed for testing functionality of entity system 140 and should not be provided to a third party.

In an embodiment, an overall cyber-scan score may be calculated for a given scanning campaign and/or for a combination of scanning campaigns (e.g., as an average). For example, the cyber-scan score may be a value, in a range from zero to one hundred, that increases as the number of passed tests increases (i.e., detected vulnerabilities decreases) and decreases as the number of passed tests decreases (i.e., detected vulnerabilities increases). As on example, the cyber-scan score may be a percentage of tests that were passed during the scanning campaign. Thus, for instance if an entity system 140 failed 20% of the tests in a given scanning campaign, the cyber-scan score would be 80.

5. Automated Phishing Simulation

Figure 7:
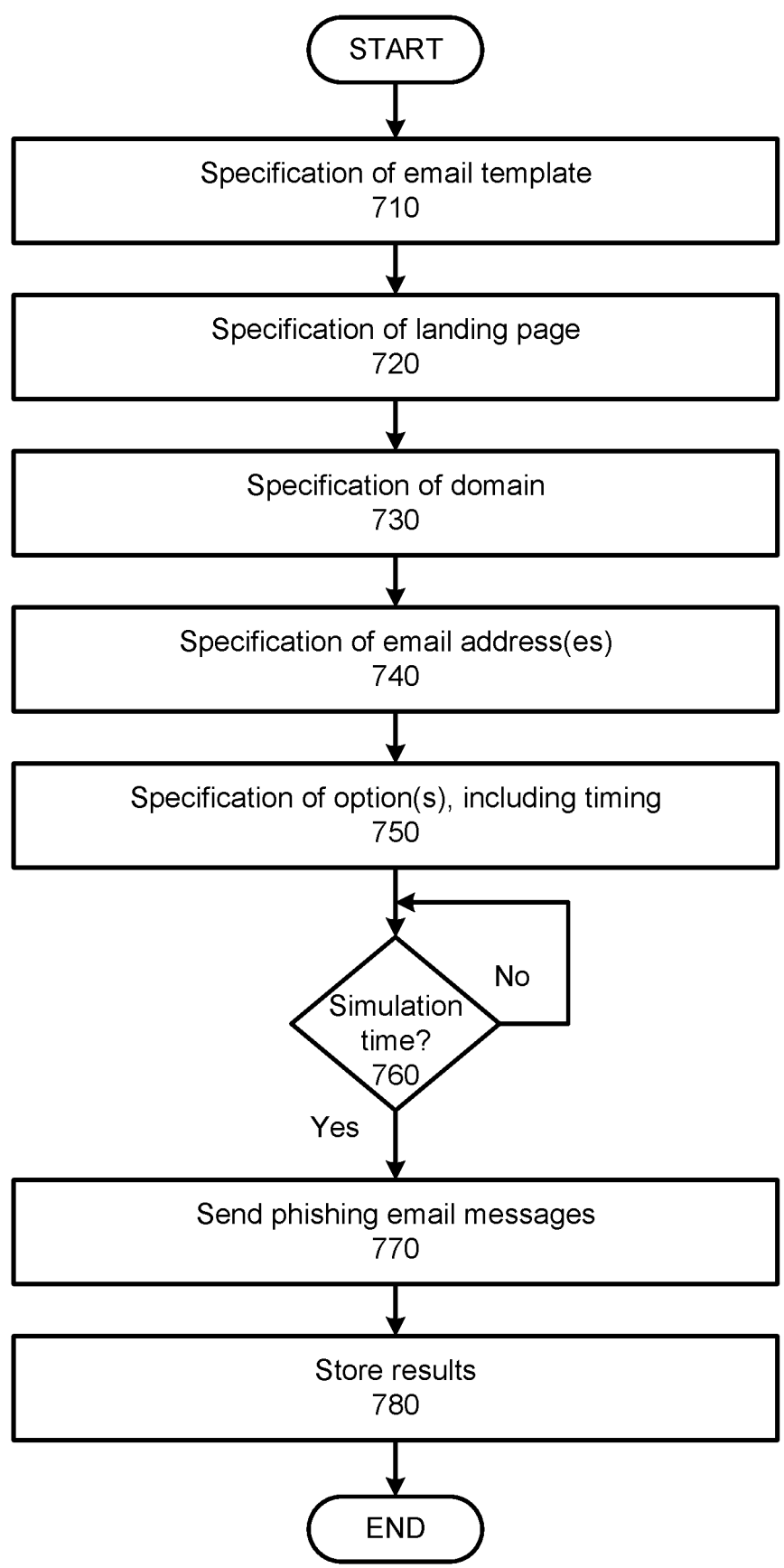
FIG. 7 illustrates an example flowchart for an automated phishing simulation, according to an embodiment.

In an embodiment, testing server 320 may execute an automated phishing simulation against entity system 140. FIG. 7 illustrates an example flowchart for an automated phishing process 700, according to an embodiment. Process 700 may be implemented by platform 110, including assessment server 310 and/or testing server 320, to establish an automated phishing campaign. For example, subprocesses 710-750 may be performed by assessment server 310, and subprocesses 760-780 may be performed by testing server 320. However, other arrangements and configurations for implementing process 700 are also possible.

In subprocess 710, an email template may be specified. In particular, the user, representing an entity, may select a predefined or previously generated email template, upload an email template, and/or create a new email template. In an embodiment, graphical user interface 312 may comprise a Rich Text Format (RTF) editor and/or HTML editor with support for Cascading Style Sheets (CSS), through which the user can create a new email template and/or edit an existing email template. Alternatively, graphical user interface 312 may comprise input(s) for specifying the value of one or a plurality of parameters, which are then used to automatically generate an email template. In all cases, the email template may comprise placeholder(s) for one or a plurality of variable field values. Thus, values may be automatically merged into the placeholder(s) of the email template to create email messages. In an embodiment, a list of predefined email templates, from which a user may select the email template, may be generated from email messages that have been used and observed in actual phishing scams. It should be understood that the specified email template is used to generate the email messages to be used for a phishing campaign.

In subprocess 720, a landing page may be specified. In particular, the user, representing an entity, may select a predefined or previously generated landing page, upload a landing page, clone an existing landing page, and/or create a new landing page. In an embodiment, graphical user interface 312 may comprise a Rich Text Format (RTF) editor and/or HTML editor with support for Cascading Style Sheets (CSS) and/or JavaScript, through which the user can create a new landing page and/or edit an existing landing page. Alternatively, graphical user interface 312 may comprise input(s) for specifying the value of one or a plurality of parameters, which are then used to automatically generate a landing page. Additionally or alternatively, graphical user interface 312 may comprise an input for specifying a URL, and the software may responsively and automatically copy the webpage at the URL and store the copied webpage in database 114 for use as a landing page. Graphical user interface 312 may also comprise an HTML editor that enables the user to modify the copied webpage as desired. In all cases, the landing page may be hosted by platform 110 or another platform that provides information to testing server 320 about visits to the landing page. It should be understood that a hyperlink to the specified landing page may be incorporated into the email template (e.g., inserted into a placeholder in the email template) to test a recipient's ability and/or proclivity to select the hyperlink and interact with the landing page.

In subprocess 730, a domain may be specified. In particular, the user, representing an entity, may select a domain from a list of predefined or previously specified domains and/or input a new domain into an input of graphical user interface 312. In an additional or alternative embodiment, the user may also select a username from a list of predefined or previously specified usernames and/or input a new username into an input of graphical user interface 312. It should be understood that the specified domain will be incorporated into the sender email address for the email messages sent during the phishing campaign. In the case that a username is specified, the specified username will also be incorporated into the sender email address for the email messages sent during the phishing campaign. In other words, the sender email address may be generated as "[specified username]@[specified domain]" if the username and domain are specified, "[default username]@[specified domain]" if only the domain is specified, "[specified username]@[default domain]" if only the username is specified, or "[default username]@[default domain]" if neither the username nor the domain is specified.

In subprocess 740, one or more email addresses are specified. In particular, the user, representing an entity, may select one or more email addresses or group of email addresses from a list of previously specified email addresses, upload a list of one or more email addresses, and/or manually input one or more email addresses into one or more inputs of graphical user interface 312. When a list of email addresses is uploaded, that list of email addresses may be stored as a group for selection in future phishing campaigns. In an embodiment, the software may verify that all specified email addresses are within a domain upon which the user is authorized to simulate phishing (e.g., an appropriate send-to domain of entity system 140). If any of the email addresses are not within an authorized domain, they may be automatically excluded, and the user may be notified of their exclusion.

In subprocess 750, one or more options may be selected. In particular, the user, representing an entity, may specify any available options, or alternatively, accept default values for the available options. The options may comprise a timing for conducting the phishing simulation. The timing may be immediate, a future date and time, time interval or frequency for periodic testing, and/or the like.

In subprocess 760, process 700 waits for the timing specified in the options in subprocess 750. It should be understood that if no timing was specified or the timing was specified as immediate, subprocess 760 may be skipped, such that process 700 proceeds directly from subprocess 750 to 770. Otherwise, if the timing is specified as a future date and time or as a time interval or frequency, subprocess 760 waits until the specified future date and time, expiration of the specified time interval, or according to the specified frequency. In particular, if it is not time for the scan (i.e., "No" in subprocess 760), process 700 continues to wait. On the other hand, if it is time for the scan (i.e., "Yes" in subprocess 760), process 700 proceeds to subprocess 770.

In subprocess 770, phishing email messages may be generated and sent (e.g., via a Simple Mail Transfer Protocol (SMTP) server of platform 110). Phishing email messages may be generated by incorporating a hyperlink to the landing page, specified in subprocess 720, and any other placeholder values into the email template, specified in subprocess 710. These phishing emails may then be sent from the domain, specified in subprocess 730, to each of the email address(es), specified in subprocess 740, according to any options specified in subprocess 750. It should be understood that testing server 320 may track the opening or viewing of these phishing email messages using known mechanisms (e.g., tracking pixel). Additionally or alternatively, testing server 320 may track each time that a recipient of a phishing email message selects the hyperlink to the landing page in the phishing email message. In particular, the landing page may be under control and management of testing server 320, such that it can track each visit to the landing page and/or any interactions with the landing page, such as selecting a hyperlink on the landing page, inputting information into one or more inputs on the landing page, downloading a file from the landing page, and/or the like. The hyperlink to the landing page in the phishing email messages may be individualized for each recipient of a phishing email message (e.g., by appending a parameter value that is unique to each phishing email message), so that testing server 320 can identify the particular visitor to the landing page (e.g., by mapping the unique parameter value in the hyperlink in a particular phishing email message to the recipient email address specified for that phishing email message). Thus, test results 324 from the phishing campaign can be used to determine which employee(s) were successfully exploited by the phishing simulation. The severity of the simulated breach can be determined based on those employees' roles within the entity. For example, successful phishing of employees having greater access to sensitive information may represent a more severe breach than successful phishing of employees have less access or no access to sensitive information.

As each phishing campaign is being performed, the results of the phishing campaign may be displayed, in real time and/or after completion of the phishing campaign, in the dashboard of graphical user interface 312. For example, the dashboard may display performance metrics, email addresses from which the phishing email message was bounced and/or other failures or errors, any test scores that have been calculated (e.g., based on the number of interactions with the landing page), the severity of interactions with the landing page (e.g., the degree to which an employee interacted with the landing page, the position or role of the employee who interacted with the landing page, etc.), and/or the like. The dashboard or other screen of graphical user interface 312 may also comprise an input for pausing or terminating the phishing campaign before completion. Graphical user interface 312 may also comprise an input for suppressing a phishing campaign from reporting, for example, if the phishing campaign is only being performed for testing functionality of entity system 140 (e.g., a spam or phishing filter) and should not be provided to a third party.

In an embodiment, an overall cyber-phishing score may be calculated for a given phishing campaign and/or for a combination of phishing campaigns (e.g., as an average). For example, the cyber-phishing score may be a value, in a range from zero to one hundred, that increases as the number and/or severity of interactions with the landing page decreases and decreases as the number and/or severity of interactions with the landing page increases. As one example, the cyber-phishing score may be a percentage of recipients who did not visit the landing page. Thus, for instance, if 20% of the unique recipients of the phishing email message in a given phishing campaign visited the landing page, the cyber-phishing score would be 80.

6. Example Use Cases

In an example use case, a supervisory user, representing an entity, may start a new assessment via a dashboard or other screen of graphical user interface 312. In an embodiment in which different types of cybersecurity assessments are available, the supervisory user may select the desired type of cybersecurity assessment via graphical user interface 312. In an embodiment in which only a single type of cybersecurity assessment is available, the supervisory user may simply select one or more inputs (e.g., in the dashboard of graphical user interface 312) to initiate a new cybersecurity assessment. In an embodiment, an entity may perform a plurality of distinct cybersecurity assessments, of the same or different types, to produce distinct cybersecurity assessments 316 at the completion of each cybersecurity assessment.

Once a new cybersecurity assessment is initiated, the supervisory user may be provided with a questionnaire. The questionnaire may comprise questions to be answered, requests for declarative statements, requests for supporting documents, and/or the like that are associated with a single security domain or a plurality of security domains. The supervisory user may utilize graphical user interface 312 to assign different portions of the questionnaire or to assign different security domains, represented by portions of the questionnaire, to different users.

Once a user has been assigned to a portion of the questionnaire, the user may receive a notification (e.g., email message with hyperlink to the assigned portion of the questionnaire within graphical user interface 312, notification in the user's dashboard within graphical user interface 312, etc.) with a prompt to complete the assigned portion of the questionnaire. The user may utilize inputs in one or more screens of graphical user interface 312 to provide responses to the assigned portion of the questionnaire. These responses may comprise answers to questions, declarative statements, supporting documents (e.g., uploaded via graphical user interface 312), and/or the like. The questionnaire may be designed to elicit responses that provide detailed information about the entity's cybersecurity controls (e.g., practices and processes).

The responses from all users, to whom portions of the questionnaire(s) have been assigned, are collected by assessment server 310 as data 314 and stored in database 114, for example, as an implementation of subprocess 410. Assessment server 310 may monitor the responses and notify a user if that user's assigned portion of the questionnaire has not been completed within a defined time period or by a defined date and time. The defined time period or date and time for responses to be completed may be specified by the supervisory user (e.g., when assigning portions of the questionnaire to users) or may be a predefined system or default setting. As data 314 are collected from the assigned user, the progress (e.g., as a percentage or ratio of responses completed to total number of responses needed) may be visually represented in the dashboard of the supervisory user. Once all data 314 has been collected, a cyber-hygiene score may be calculated from data 314, for example, as an implementation of subprocess 420.

In addition, testing server 320 may test entity system 140, for example, as an implementation of subprocess 430. In particular, the supervisory user may specify tests 322 to be performed and the options and other information required for each test 322 to be performed via graphical user interface 312. Examples of this information are described elsewhere herein with respect to the automated penetration testing (e.g., FIG. 5), automated security scan (e.g., FIG. 6), and automated phishing simulation (e.g., FIG. 7). Testing server 320 may then perform tests 322 against entity system 140, according to the specified information. It should be understood that this testing (e.g., subprocess 430) may be performed independently of the collection of data 314 (e.g., subprocess 410), such that the testing may be performed before, in parallel with, or after the collection of data 314. However, one or more of tests 322 may be selected and/or configured according to at least a portion of data 314 (e.g., responses to the questionnaire), in which case, such tests 322 should be performed after the collection of the required portion of data 314.

The test results 324 from tests 322 may be collected by testing server 320 and stored in database 114. As each test 322 is completed, a test score may be calculated for the test. Once all tests 322 have been completed, the test scores for each test 322 may be combined into a single overall cyber-breach score (e.g., as a straight or weighted average of the test scores), for example, as an implementation of subprocess 440. To facilitate this combination of test scores into the cyber-breach score, all test scores may utilize the same range of values (e.g., zero to one hundred) or may be converted to the same range of values. Notably, tests 322 may comprise both an internal test (e.g., automated penetrating testing) and an external test (e.g., automated security scan, automated phishing simulation, etc.), such that the cyber-breach score indicates an actual level of compliance with and effectiveness of implemented cybersecurity controls, both internally and externally, and accurately reflects the susceptibility of entity system 140 to an attack (e.g., data breach, ransomware, etc.), both internally and externally.

Once the cyber-hygiene score and cyber-breach score have been calculated, assessment server 310 may generate the overall cybersecurity assessment 316, for example, as an implementation of subprocess 450. Cybersecurity assessment 316 may comprise the cyber-hygiene score and cyber-breach score. In addition, cybersecurity assessment 316 may provide details about how the cyber-hygiene score was calculated (e.g., on a per-response basis) and/or detail about how the cyber-hygiene score was calculated (e.g., including the test scores that were combined into the cyber-hygiene score and how those test scores were calculated). Cybersecurity assessment 316 may also comprise benchmarking of the entity's cyber-hygiene score and/or cyber-breach score against the cyber-hygiene scores and/or cyber-breach scores, respectively, of the entity's peers. This benchmarking may be provided at a granular level. For example, each response to a question or request in the questionnaire, as represented in data 314, may be benchmarked against the peer responses to the same question or request. Where appropriate, the benchmark may comprise the percentile rank of the entity's response among its peers. Similarly, the entity's test results 324 for one or more tests 322 may be benchmarked against the test results for the same tests performed against the entity's peers. Advantageously, benchmarking provides context to the entity's cybersecurity assessment 316, so that the entity can visualize its cybersecurity practices and processes relative to its peers, which in turn, can inform the entity's cyber-risk mitigation and planning.

Cybersecurity assessment 316 may highlight critical failures (e.g., inadequate responses to the questionnaire, responses to the questionnaire that are significantly below benchmarks, failed tests 322, etc.) in cybersecurity controls. In an embodiment, upon detection of a critical failure in the cybersecurity controls in entity system 140, testing server 320 or assessment server 310 may immediately alert a responsible user for the entity. The alert may be provided via email message, text message, and/or other communication to the responsible user. In addition, details about the failure may be provided in the responsible user's dashboard in graphical user interface 312 for immediate risk mitigation.

Cybersecurity assessment 316 may be used to identify a current level of an entity's cyber-hygiene, the entity's susceptibility to cyber-risk, how the entity's cybersecurity controls compare to peers in the same or similar industries, and/or the like, so that the entity can implement contextual and timely risk mitigation and/or prepare a plan of action or cybersecurity plan. For example, a responsible employee of the entity may review a visual representation of cybersecurity assessment 316 (e.g., in graphical user interface 312, as an electronic or printed document, etc.) to identify security domains in which the entity is non-compliant and/or lags behind its peers, identify specific vulnerabilities in entity system 140 (e.g., concerning responses to the questionnaire, assets that have failed tests 322, etc.), and/or the like, and take appropriate action. The responsible employee may also identify security domains in which it exceeds its peers, according to the benchmarking analytics, and shift resources from those security domains to security domains in which it lags behind its peers.

In addition, cybersecurity assessment 316 may be used to efficiently and effectively complete an assessment of compliance with cybersecurity mandates, such as CMMC, or other cybersecurity standards. This can facilitate a third-party audit and certification, as well as the acquisition of cyber-insurance for affordable transfer of cyber-risk to an insurance provider. For example, an authorized user may provide access to cybersecurity assessment 316 to one or more third parties, such as an auditor, certification authority, and insurance provider. Access may be provided by exporting cybersecurity assessment 316 into an electronic document and providing it to the third party. Alternatively or additionally, access may be provided by providing a hyperlink to cybersecurity assessment 316, within graphical user interface 312, to the third party. In this case, the third party may be required to have an account with platform 110 and authenticate with that account, prior to viewing cybersecurity assessment 316. Alternatively or additionally, access may be provided by providing access to cybersecurity assessment 316 to the third party via an API of platform 110 and/or submitting cybersecurity assessment 316 to the third party's system 150 via an API of third-party system 150. In all cases, the entity may easily submit cybersecurity assessment 316 to a plurality of third parties. This can be especially useful for submitting cybersecurity assessment 316 to a plurality of insurance brokers or providers to efficiently obtain a plurality of quotes for cyber-insurance. Accordingly, cybersecurity assessment 316 facilitates informed and competitive cyber-insurance pricing.

In an embodiment, cybersecurity assessment 316 comprises alerts that are triggered when a cybersecurity control is detected to be deficient based on tests 322 and require corrective action. Additionally or alternatively, cybersecurity assessment 316 may comprise a plan of action that identifies the overall cybersecurity controls (e.g., practices and processes) that are deficient or require corrective action and/or a system security plan that identifies the status and details of all cybersecurity controls that must be fully implemented and operational in order to mitigate cyber-risk and comply with a given standard (e.g., CMMC).

In an embodiment, cybersecurity assessment also comprises other analytics, performed by assessment server 310 or other system, to facilitate risk mitigation and planning. These other analytics may utilize artificial intelligence, such as machine-learning models, to calculate the probability of a data breach based on one or more features, such as test results 324 over a period of time, type(s) of cybersecurity controls that failed and/or weightings of failed cybersecurity control(s), recurrence of failures in cybersecurity controls, time taken to rectify deficiencies in cybersecurity controls, benchmarking results, and/or the like. The results of the analytics (e.g., the calculated probability of a data breach) may be incorporated into cybersecurity assessment 316 to supplement the cyber-breach score.

In addition, graphical user interface 312 may enable the user to drill down to the root causes or contributing factors for the cyber-hygiene score, cyber-breach score, benchmarking to peers, probability of a data breach, and/or the like. These factors may comprise detected deficiencies or failures in cybersecurity controls (e.g., in data 314 and/or test results 324), other details from data 314 and/or test results 324, a history of performance of cybersecurity controls, benchmarking comparisons, and/or the like. This insight, especially in combination with inside-out and outside-in controls testing, can provide timely intelligence on the efficacy of cybersecurity controls and any security holes or other vulnerabilities, to facilitate the timely rectification of those vulnerabilities before a threat actor can exploit them. Thus, cyber-risk can be mitigated and data theft or ransomware attacks can be prevented.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
receive data representing asserted cybersecurity controls within an entity system;
calculate a cyber-hygiene score for each of a plurality of cybersecurity standards based on the received data, wherein each cyber-hygiene score indicates an extent of implementation of a plurality of cybersecurity controls associated with a respective one of the plurality of cybersecurity standards;
perform a plurality of automated cybersecurity tests on the entity system, wherein the plurality of automated cybersecurity tests comprises an inside-out controls test, an outside-in controls test, and a social-engineering test;

for each of the plurality of automated cybersecurity tests, calculate a test score based on results from the automated cybersecurity test;

calculate a cyber-breach score based on the test scores calculated for the plurality of automated cybersecurity tests, wherein the cyber-breach score indicates an effectiveness of the implementation of the plurality of cybersecurity controls associated with the plurality of cybersecurity standards; and generate a cybersecurity assessment based on at least one cyber-hygiene score and the cyber-breach score.

2. The method of claim 1, further comprising using the at least one hardware processor to update the at least one cyber-hygiene score based on the results from the automated cybersecurity tests and a mapping between the results and security domains represented in the received data.

3. The method of claim 1, wherein calculating the cyber-breach score comprises combining the tests scores calculated for the plurality of automated cybersecurity tests.

4. The method of claim 1, wherein the inside-out controls test is executed by a software agent on a node within a network of the entity system.

5. The method of claim 4, further comprising using the at least one hardware processor to, in response to a triggering event, trigger the inside-out controls test via a call to the software agent.

6. The method of claim 5, further comprising using the at least one hardware processor to instantiate and configure a dedicated virtual machine to receive results of the inside-out controls test from the software agent.

7. The method of claim 1, wherein the outside-in controls test is performed against Internet-facing assets of the entity system.

8. The method of claim 7, further comprising using the at least one hardware processor to receive one or more Uniform Resource Locators (URLs), wherein the outside-in controls test is performed on all of the received one or more URLs.

9. The method of claim 1, wherein the social-engineering test comprises a phishing simulation against one or more email addresses.

10. The method of claim 9, further comprising using the at least one hardware processor to:
receive a specification of a landing page;
incorporate a hyperlink to the landing page into an email message;
send the email message to each of the one or more email addresses; and
track visits to the landing page.

11. The method of claim 10, further comprising using the at least one hardware processor to host the landing page.

12. The method of claim 10, further comprising using the at least one hardware processor to:
receive a specification of an email template; and
generate the email message from the email template.

13. The method of claim 10, further comprising using the at least one hardware processor to receive a specification of a domain, wherein the email message is sent from the domain.

14. The method of claim 10, wherein the one or more email addresses are a plurality of email addresses, and wherein the method further comprises using the at least one hardware processor to receive a specification of the plurality of email addresses.

15. The method of claim 1, wherein receiving data comprises:
generating a graphical user interface; and
receiving responses to a questionnaire via the graphical user interface, wherein the questionnaire comprises one or more of questions, requests for declarative statements, or requests for supporting documents,
wherein each cyber-hygiene score is calculated based on the responses.

16. The method of claim 1, further comprising using the at least one hardware processor to assign each of a plurality of portions of a questionnaire to one of a plurality of second users based on a user operation from a first user, wherein receiving data comprises, for each of the plurality of second users:
generating a graphical user interface; and
receiving responses to the portion of the questionnaire, assigned to the second user, via the graphical user interface.

17. The method of claim 16, wherein the questionnaire comprises one or more of questions, requests for declarative statements, or requests for supporting documents.

18. The method of claim 1, further comprising determining a probability of a cybersecurity breach based on one or more features in one or both of the received data or the results from the one or more automated cybersecurity tests, wherein the cybersecurity assessment is further based on the probability of a cybersecurity breach.

19. The method of claim 18, further comprising generating a comparison of each of one or more of the at least one cyber-hygiene score, the cyber-breach score, or the probability of a cybersecurity breach to a benchmark derived from peers of an entity operating the entity system, wherein the cybersecurity assessment comprises the comparison.

20. The method of claim 18, wherein the probability of a cybersecurity breach is determined using a machine-learning model that is trained to predict the probability of a cybersecurity breach based on the one or more features.

21. The method of claim 18, wherein the cybersecurity assessment comprises the at least one cyber-hygiene score, the cyber-breach score, and the probability of a cybersecurity breach.

22. The method of claim 18, wherein the cybersecurity assessment comprises a graphical user interface that comprises a hierarchical arrangement of expandable and collapsible graphical elements that provide access to details for the at least one cyber-hygiene score, the cyber-breach score, the probability of a cybersecurity breach, and the comparison.

23. The method of claim 1, further comprising detecting one or more failures in the implementation of the plurality of cybersecurity controls associated with the at least one cybersecurity standard, based on one or both of the received data or the results from the one or more automated cybersecurity tests, wherein the cybersecurity assessment identifies each of the detected one or more failures.

24. The method of claim 23, further comprising, in response to detecting the one or more failures, initiating at least one alert to one or more recipients.

25. The method of claim 1, wherein the inside-out controls test is performed by a software agent within the entity system, the outside-in controls test is performed against Internet-facing assets of the entity system from outside the entity system, and the social-engineering test comprises a phishing simulation against one or more email addresses, and wherein calculating the cyber-breach score comprises combining the tests scores calculated for the plurality of automated cybersecurity tests.

26. The method of claim 1, wherein each of the plurality of automated cybersecurity tests are performed at one or more times specified by a user.

27. A system comprising:
at least one hardware processor; and
one or more software modules that are configured to, when executed by the at least one hardware processor,
receive data representing asserted cybersecurity controls within an entity system,
calculate a cyber-hygiene score for each of a plurality of cybersecurity standards based on the received data, wherein each cyber-hygiene score indicates an extent of implementation of a plurality of cybersecurity controls associated with a respective one of the plurality of cybersecurity standards,
perform a plurality of automated cybersecurity tests on the entity system, wherein the plurality of automated cybersecurity tests comprises an inside-out controls test, an outside-in controls test, and a social-engineering test,
for each of the plurality of automated cybersecurity tests, calculate a test score based on results from the automated cybersecurity test,
calculate a cyber-breach score based on the test scores calculated for the plurality of automated cybersecurity tests, wherein the cyber-breach score indicates an effectiveness of the implementation of the plurality of cybersecurity controls associated with the plurality of cybersecurity standards, and
generate a cybersecurity assessment based on at least one cyber-hygiene score and the cyber-breach score.

28. A non-transitory computer-readable medium having instructions stored therein, wherein the instructions, when executed by a processor, cause the processor to:
receive data representing asserted cybersecurity controls within an entity system;
calculate a cyber-hygiene score for each of a plurality of cybersecurity standards based on the received data, wherein each cyber-hygiene score indicates an extent of implementation of a plurality of cybersecurity controls associated with a respective one of the plurality of cybersecurity standards;
perform a plurality of automated cybersecurity tests on the entity system, wherein the plurality of automated cybersecurity tests comprises an inside-out controls test, an outside-in controls test, and a social-engineering test;
for each of the plurality of automated cybersecurity tests, calculate a test score based on results from the automated cybersecurity test;
calculate a cyber-breach score based on the test scores calculated for the plurality of automated cybersecurity tests, wherein the cyber-breach score indicates an effectiveness of the implementation of the plurality of cybersecurity controls associated with the plurality of cybersecurity standards; and
generate a cybersecurity assessment based on at least one cyber-hygiene score and the cyber-breach score.

* * * * *